United States Patent [19]

Bachmann

[11] 4,335,768
[45] Jun. 22, 1982

[54] DEPTH OF CUT ADJUSTMENT MECHANISM

[75] Inventor: Rainer Bachmann, Hohenstein, Fed. Rep. of Germany

[73] Assignee: Black & Decker Inc., Newark, Del.

[21] Appl. No.: 160,822

[22] Filed: Jun. 18, 1980

[51] Int. Cl.³ ............................................. B27C 1/10
[52] U.S. Cl. ................................... 145/4; 144/117 C
[58] Field of Search ............... 144/114 R, 117 C, 130; 145/4, 4.1, 4.2

[56] References Cited

U.S. PATENT DOCUMENTS

| | | |
|---|---|---|
| 1,305,734 | 6/1919 | Moore ............................ 144/117 C |
| 1,432,860 | 10/1922 | Hoy et al. |
| 1,527,785 | 2/1925 | Carter |
| 1,812,755 | 6/1931 | Quinsler |
| 2,746,499 | 5/1956 | Greeley |
| 2,771,105 | 11/1956 | Metoff |
| 2,774,399 | 12/1956 | Emmons |
| 3,407,857 | 10/1968 | Bentley |

FOREIGN PATENT DOCUMENTS

| | | |
|---|---|---|
| 1080764 | 4/1960 | Fed. Rep. of Germany .......... 145/4 |
| 1860337 | 10/1962 | Fed. Rep. of Germany |
| 7013796 | 7/1970 | Fed. Rep. of Germany |
| 2141584 | 3/1973 | Fed. Rep. of Germany .......... 145/4 |
| 263087 | 8/1949 | Switzerland |

*Primary Examiner*—W. D. Bray
*Attorney, Agent, or Firm*—Walter Ottesen; Edward D. Murphy; Harold Weinstein

[57] ABSTRACT

A depth of cut adjustment mechanism for a power planer including a double threaded elevation adjustment bolt (40) extending downwardly into threaded engagement with a stem (32) extending upwardly from the front shoe (16) of the planer (2). Rotation of the bolt (40) is controlled by a knob (20) attached to the head portion (54) of the bolt (40). The knob (20) has associated therewith a scale (41) which is readily calibrated so that a zero reading on the scale corresponds to a zero depth of cut. The adjustment mechanism further provides a positively located park position wherein the front shoe (16) is extended downwardly beyond the cutting blade (8) to effectively elevate the cutting blade (8) so that it does not mar the surface upon which the planar (2) is set when not in use.

10 Claims, 7 Drawing Figures

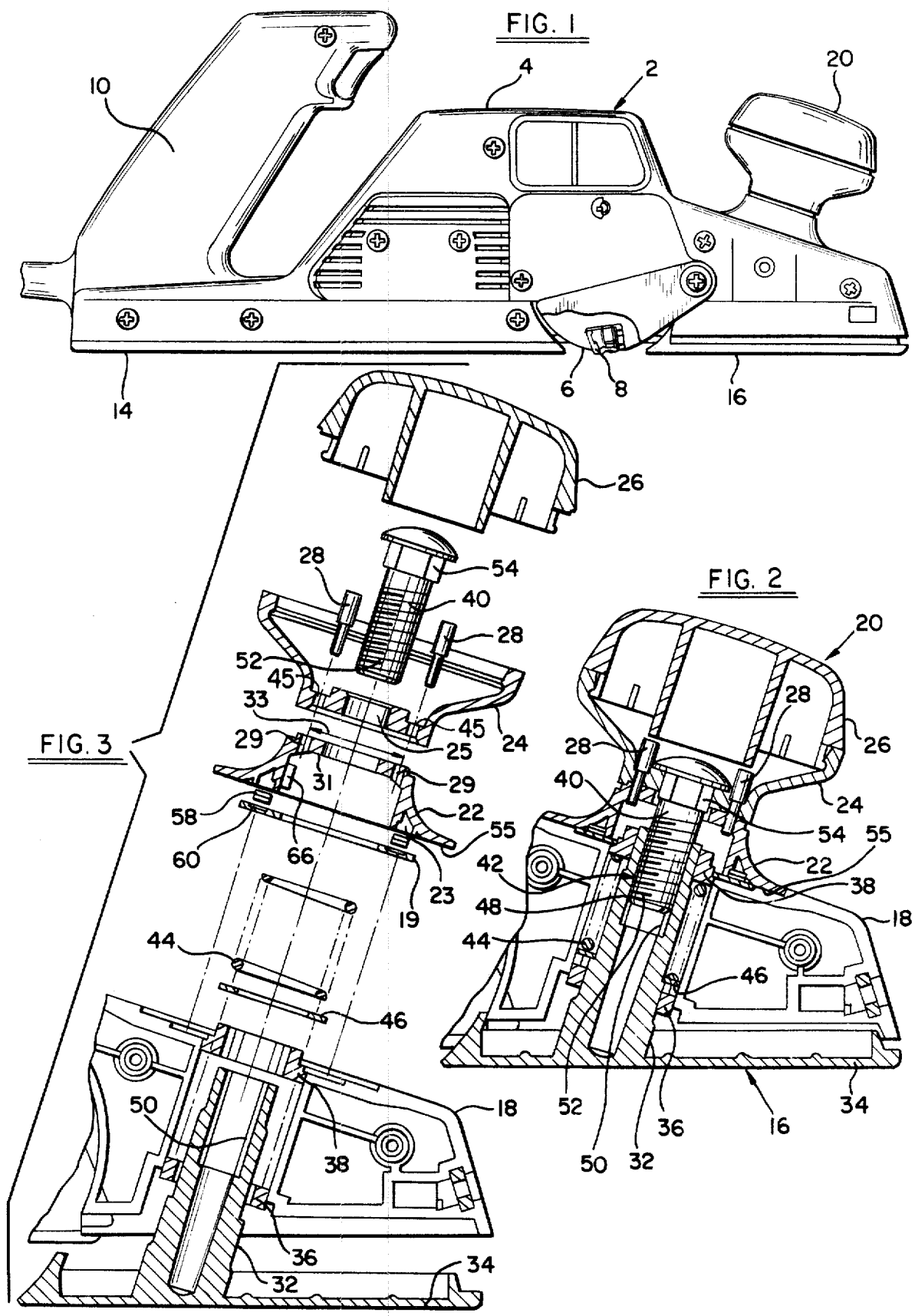

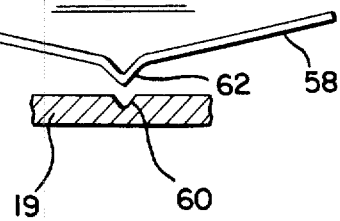
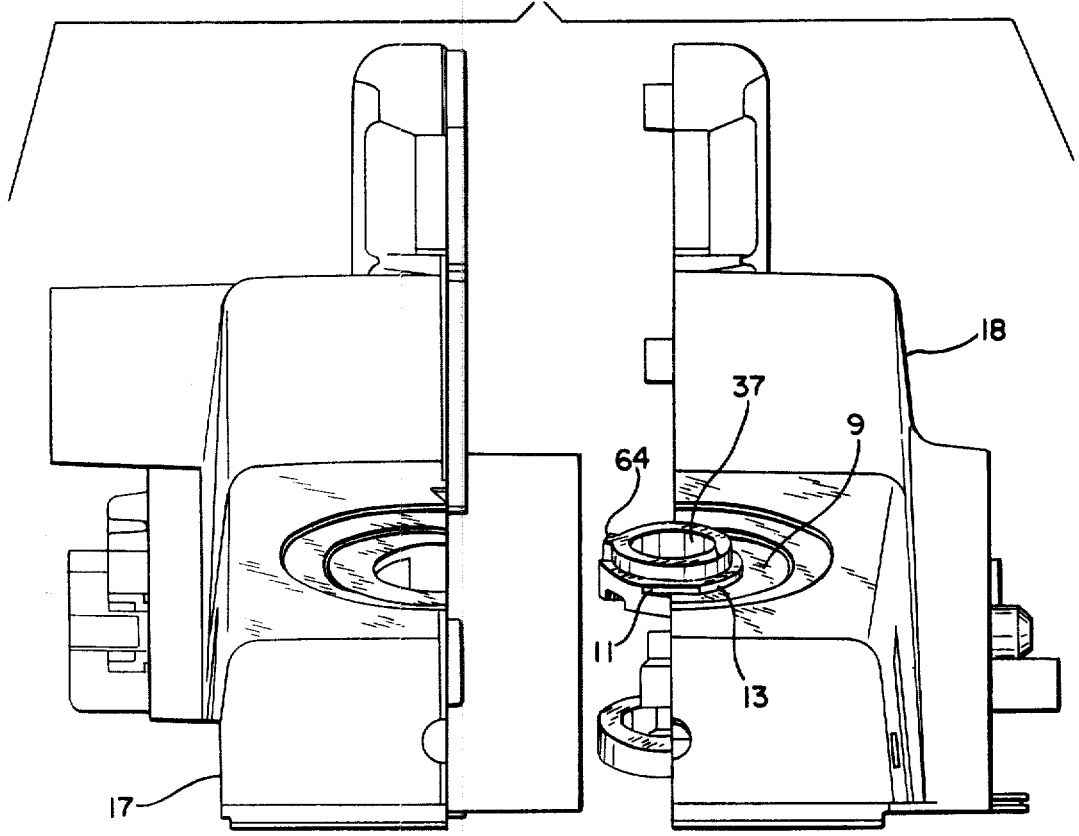
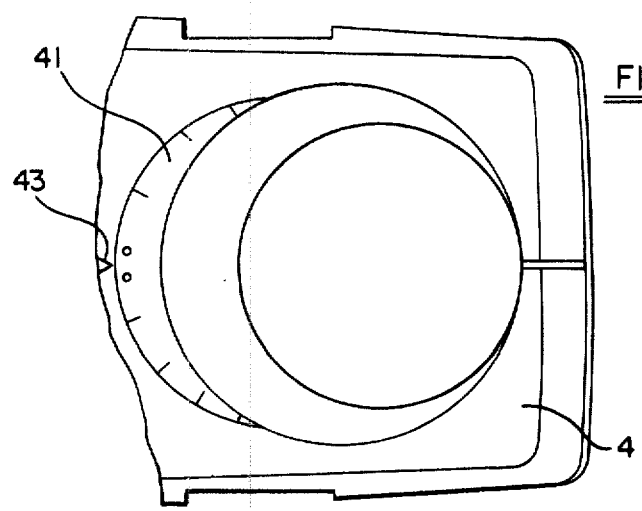

DEPTH OF CUT ADJUSTMENT MECHANISM

BACKGROUND AND SUMMARY OF THE INVENTION

The present invention relates to portable power planers and in particular to an improved elevation adjusting arrangement for a power planer. In general, portable power planers comprise a motor driven rotary cutter head having one or more cutting blade assemblies disposed thereon for performing a cutting operation upon the surface of a workpiece as the cutter head rotates. The bottom surface of the tool comprises a fixed shoe located rearwardly of the cutter head and an adjustable shoe disposed forwardly of the cutter head. As the front shoe is adjusted upwardly or downwardly, the cutting depth of the cutting blade of the planer is adjusted accordingly.

Known elevation adjustment arrangements for power planers typically comprise a stud which extends upwardly from the front shoe through a boss having an adjustment cap threaded onto the top of the stud to move the shoe vertically upwardly or downwardly as the cap is turned. In general, however, no calibration is provided to indicate to the operator exactly and precisely the depth of cut setting. Also, fine adjustments generally cannot be made with conventional adjustment mechanisms.

Accordingly, it is one object of the present invention to provide an improved elevation adjusting arrangement for a power planer which includes an accurate and easily calibrated scale. Zero on the scale corresponds to the position of the adjustable shoe providing a zero depth of cut. The preferred embodiment of the present invention enables the operator to adjust the depth of the cut in 0.1 mm steps from 0 to 1.5 mm.

Another object of the present invention is to provide an improved elevation adjusting mechanism for a power planer which is highly stable and thus capable of accurate, fine adjustments in the depth of cut for more accuracy in cutting. The present invention accomplishes this by utilizing a double thread on a bolt engaging the stem of the adjustable shoe which permits the use of a steeper pitched thread to provide the desired range of elevational movement in the adjustable shoe with reduced rotational movement of the adjustment knob, while at the same time providing increased thread contact for improved stability.

Another object of the present invention is to provide an improved elevation adjusting mechanism having a positive "park" position wherein the adjustable shoe extends downwardly beyond the cutting blade of the cutting head so that the cutting blade does not mar the work surface when the power planer is set down. Additionally, the present invention also includes means for positively locating the park position.

Briefly, the preferred depth of cut adjustment mechanism for a power planer disclosed herein includes a double threaded bolt which extends downwardly into engagement with a corresponding internally double threaded stem extending upwardly from the front shoe of the planer. Rotation of the bolt is controlled by a knob attached to the head portion of the bolt. The knob in turn has associated therewith a height adjustment scale which is capable of being readily calibrated, wherein zero on the scale corresponds to the position of the adjustable front shoe providing zero depth of cut. The adjustment mechanism further provides a positively engageable park position wherein the front shoe is extended downwardly beyond the fixed shoe so that the cutting blade of the planer does not mar a smooth surface when the power planer is set to rest thereupon.

Other objects and advantages of the present invention will become apparent from a reading of the detailed description of the preferred embodiment which makes reference to the following set of drawings in which:

BRIEF DESCRIPTION OF THE DRAWINGS

FIG. 1 is an elevated view of a power planer incorporating the elevation adjusting arrangement of the present invention;

FIG. 2 is a detail elevated view, partially in section, of the elevation adjusting arrangement of the present invention;

FIG. 3 is an exploded view of the elevation adjusting arrangement shown in FIG. 2;

FIG. 4 is a detail view showing the interface between the ratchet springs and the ratchet disc in the elevation adjustment arrangement of the present invention;

FIG. 5 is a front elevated view of the left-hand and right-hand housing portions of the power planer of the present invention;

FIG. 6 is a plan view of the front portion of the housing of the power planer of the present invention.

DETAILED DESCRIPTION OF THE PREFERRED EMBODIMENT

Figure 7:
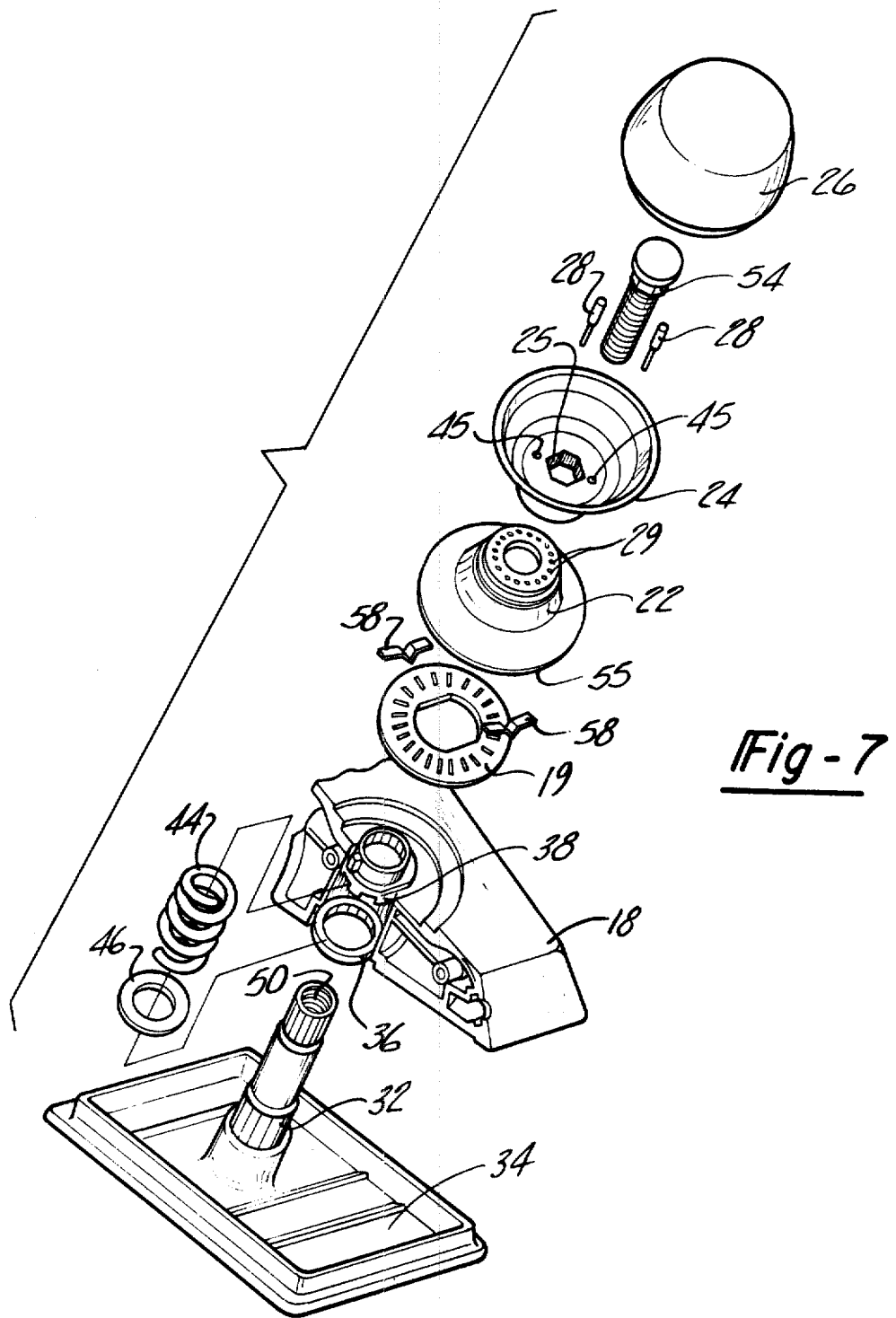
FIG. 7 is an exploded perspective view of the elevation adjusting arrangement of the present invention.

Referring to FIG. 1, a power planer 2 incorporating an elevation adjusting mechanism according to the present invention is shown. The power planer 2 is otherwise conventional in overall layout, having a clamshell housing 4 which is shown partially cutaway to expose the cutter head 6 which supports at least one cutting blade 8. When in use, the operator grasps the tool by the rear handle 10 and knob 20 and moves the planer over the surface to be cut. The planer has a fixed shoe 14 and an adjustable front shoe 16 for engaging the work surface to be operated upon. The adjustable shoe 16 can be adjusted in elevation to control the depth to which the cutting blade 8 of the cutter head 6 penetrates the work.

FIG. 2 is an elevated view, partially in section, showing the elevation adjusting arrangement of the present invention assembled into the right-hand portion 18 of the clamshell housing 4. The control knob assembly 20 comprises upper and lower halves 26 and 24 which are detachably clipped together as shown. The lower portion 24 of knob assembly 20 rests upon a flange 22 which has scale markings thereon and hence is referred to herein as a scale member. Removable pins 28, having a purpose to be described later, secure the lower knob half 24 to the scale member 22 to prevent rotation therebetween.

The adjustable shoe 16 is equipped with a stem 32 formed integrally with the base 34 thereof. The stem 32 engages sleeve bearings 36 and 38 integrally formed on the molded housing half 18, as best shown in FIG. 5. The bearings 36 and 38 and stem 32 are formed with mutually engaging longitudinally extending surface flats 37 (FIGS. 5 and 7) to prevent rotation of adjustable shoe 16 with respect to housing 18.

A bolt 40 threadably engages the stem 32 at thread means 42 so that rotation of knob assembly 20 will result in vertical movement of adjustable shoe 16. In particular, when knob assembly 20 is rotated, the stem 32 is moved upwardly or downwardly in sleeve bearings 36 and 38 depending upon the direction of rotation of the knob 20.

Thread means 42 consists of a double thread 48 formed on the inner wall of bore 50 and a corresponding double thread 52 formed on the shank of bolt 40. The double threaded bolt 40 and stem 32 each have two threads whose distance apart is generally half of the true pitch of the threads. Hence, the double thread arrangement reduces the size of the thread necessary to maintain the core strength of the bolt and permits the use of a greater pitch to provide the desired range of elevational movement with less rotational movement of knob assembly 20. In the preferred bolt and bore arrangement, more thread contact will exist between the bolt and the bore to provide more frictional forces at the contact interface and thereby greater stability at a selected setting. Stability is particularly important for cutting accuracy when 0.1 mm elevational differences are desired and only 1.5 mm of elevational travel is scaled by the adjustment mechanism. In addition, it will be appreciated that the stability of the adjustment shoe 34 also insures a uniform depth of cut across the width of the power planer.

Bolt 40 is provided with a hexagonal head shank portion 54 which engages a corresponding hexagonal opening 25 in the lower knob half 24 of knob assembly 20 thereby keying the bolt 40 to the control knob 20. The insertion of bolt 40 into thread means 42 also rotatably mounts lower knob half 24 onto scale member 22. A compression spring 44 is interposed between the end-face of sleeve bearing 38 and a washer 46 seated upon a shoulder in the stem 32 of adjustable shoe 16. The washer 46 is required to provide a firm seat for spring 44 so that a proper bias force is maintained against stem 32.

Referring to FIG. 5, the mutually engageable left-hand and right-hand housing halves 17 and 18 are shown. The housing halves 17 and 18 conjointly define an annular recess 9 having two flats 11 (only one of which is shown) formed at diametrically opposed locations on the inner recess wall 13 thereof. A ratchet disc 19 having a plurality of radially spaced notches 60 is seated in the recess 9 and keyed against rotation by the flats 11 (FIG. 7).

The scale member 22 is equipped with slotted openings 23 formed in the base 55 thereof for receiving two springs 58 juxtaposed across diametrically opposite arcs of circular scale member 22. With additional reference to FIG. 4, springs 58 have an intermediate contact point 62 which protrudes from scale member 22. As the knob assembly 20 is rotated, the contact points 62 of springs 58 ratchet in the radial notches 60 of ratchet disc 19. The notches 60 are circumferentially spaced at predetermined angular increments. The spacing of the angular increments and the pitch of the thread means 42 are so selected that each angular increment corresponds to a 0.1 mm change in elevation of the adjustable shoe 16. The contact points 62 engage respective adjacent notches 60 for each incremental change in elevation of the shoe 16.

The engagement of the contact points 62 of the springs 48 with the notches 60 provides an audible "click" sound indicating to the operator each incremental change in elevation. Further, the resilient force developed by the springs 58 ensures that the knob assembly 20 stays firmly in the set position until deliberately changed by the operator.

The method of calibrating the elevation adjustment mechanism of the present invention will now be explained. With particular reference to FIGS. 2, 3 and 7, a plurality of apertures or bores 29 are formed in wall 31 of the scale member 22. In the preferred embodiment, twenty bores are used and are distributed about a circle having a diameter 33. Pins 28 are inserted through the apertures or bores 45 in lower knob half 24 into a selected pair of bores 29 in scale member 22 to secure the lower knob half 24 to scale member 22 and prevent rotational movement therebetween.

Accordingly, before the pins 28 are inserted in place, the lower knob half 24 is rotated until the adjustable shoe 16 is tangentially aligned with the lowermost point of blade travel. This, of course, corresponds to the zero depth of cut position. As best illustrated in FIG. 6, scale member 22 has a notched scale 41 at the outer periphery thereof. A mark 43 formed on the housing 4 is utilized as a position indicator for the scale 41. With the adjustable shoe 16 at the zero elevation position, the scale member 22 is rotated until the zero elevation position of the scale 41 is aligned with the position indicator 43 on the housing 4. With the scale member 22 in this position, the pins 28 are then inserted, thereby keying the scale member 22 to the lower half 24 of knob assembly 20. The upper knob half 26 is then snapped onto the lower knob half 24 to prevent the pins 28 from becoming dislodged.

The elevation adjusting arrangement of the present invention also provides a positively located park position. In the park position, the adjustable shoe 16 is extended downwardly beyond the zero elevation position so that the cutting blade 8 of the cutter head 6 does not mar the surface upon which the power planer is set when not in use. To positively locate the adjustable shoe 16 in the park position, an abutment 64 is formed on the upper end face of the sleeve bearing 38 as shown in FIG. 5. The scale member 22 is provided with a corresponding abutment key 66 along the interior surface thereof (FIG. 3). Thus, when the knob assembly 20 is rotated past the zero elevation position in the counterclockwise direction, key 66 will contact abutment 64, and thereby positively locate adjustable shoe 16 in the park position.

While the above description constitutes the preferred embodiment of the present invention, it will be appreciated that the invention is susceptible to modification, variation and change without departing from the proper scope or fair meaning of the accompanying claims.

I claim:

1. In a power planer comprising a housing incorporating a motor driven cutting blade disposed intermediate a rear fixed shoe and an adjustable front shoe, and adjustment means for adjusting the elevation of said front shoe so as to effectively vary the depth of cut of said cutting blade; the improvement wherein said adjustment means comprises:

a bolt threadedly engaged to said front shoe so that rotation of said bolt imparts vertical movement to said front shoe relative to said housing;

selector means rotatable relative to said housing and having associated therewith scale means referenced to fixed reference means on said housing for providing an indication of the depth of cut of said cutting blade; and coupling means for coupling said selector means to said bolt for rotation therewith in a selectable angular position relative to said bolt to thereby permit accurate calibration of said scale means.

2. The power planer of claim 1 wherein said selector means further includes ratchet means for positively defining each predetermined incremental angular movement of said selector means.

3. The power planer of claim 1 wherein said bolt has a double thread formed thereon for threadedly engaging a correspondingly double threaded portion of said front shoe.

4. The power planer of claim 1 further including means for positively locating said selector means in a predetermined angular position corresponding to said front shoe being extended below the lowermost point of travel of said cutting blade.

5. In a power planer comprising a housing incorporating a motor driven cutting blade disposed intermediate a rear fixed shoe and an adjustable front shoe, and adjustment means for adjusting the elevation of said front shoe so as to effectively vary the depth of cut of said cutting blade; the improvement wherein said adjustment means comprises:
 selector means rotatable relative to said housing; and
 a double threaded bolt coupled to said selector means for rotation therewith and threadedly engaged to a correspondingly threaded portion of said front shoe such that rotation of said bolt imparts vertical movement to said front shoe relative to said housing whereby said double threads serve to increase the amount of vertical travel imparted to said front shoe per degree of angular movement of said bolt while maintaining adequate thread contact between said bolt and said front shoe portion to insure stability of said front shoe.

6. The power planer of claim 5 wherein said selector means has associated therewith scale means referenced to fixed reference means on said housing for providing an indication of the depth of cut of said cutting blade.

7. In a power planer comprising a housing incorporating a motor driven cutting blade disposed intermediate a rear fixed shoe and an adjustable front shoe, and adjustment means for adjusting the elevation of said front shoe so as to effectively vary the depth of cut of said cutting blade; the improvement wherein said adjustment means comprises:
 a bolt threadedly engaged to said front shoe so that rotation of said bolt imparts vertical movement to said front shoe relative to said housing;
 selector means rotatable relative to said housing and coupled to said bolt such that said bolt is rotated by said selector means; and
 stop means for positively locating said selector means in a predetermined angular position corresponding to said front shoe being extended below the lowermost point of travel of said cutting blade.

8. The power planer of claim 7 wherein said stop means is adapted to limit the rotation of said selector means in one direction to said predetermined angular position.

9. In a power planer comprising a housing incorporating a motor driven cutting blade disposed intermediate a rear fixed shoe and an adjustable front shoe, and adjustment means for adjusting the elevation of said front shoe so as to effectively vary the depth of cut of said cutting blade; the improvement wherein said adjustment means comprises:
 a control knob forwardly mounted atop said housing and rotatable relative thereto;
 a double threaded bolt coupled to said control knob for rotation therewith and threadedly engaged to a correspondingly threaded portion of said front shoe so that rotation of said control knob imparts vertical movement to said front shoe;
 scale means located intermediate said control knob and said housing and referenced to fixed reference means on said housing for providing an indication of the depth of cut of said cutting blade;
 coupling means for coupling said scale means to said control knob for rotation therewith in a selectable angular position relative to said control knob and bolt combination to thereby permit accurate calibration of said scale means; and
 means for limiting the rotation of said control knob, scale means and bolt combination in one direction to a predetermined angular position corresponding to said front shoe being extended below the lowermost point of travel of said cutting blade.

10. The power planer of claim 9 wherein said coupling means comprises at least one pin connected to said control knob and insertable in one of a plurality of holes formed in said selector means.

* * * * *